(12) United States Patent
Murzin et al.

(10) Patent No.: US 7,491,858 B2
(45) Date of Patent: Feb. 17, 2009

(54) METHOD FOR THE MANUFACTURE OF HYDROCARBONS

(75) Inventors: Dmitry Yu Murzin, Turku (FI); Iva Kubickova, Litvinov (CZ); Mathias Snåre, Turku (FI); Päivi Mäki-Arvela, Turku (FI); Jukka Myllyoja, Vantaa (FI)

(73) Assignee: Fortum Oyj, Espoo (FI)

( * ) Notice: Subject to any disclaimer, the term of this patent is extended or adjusted under 35 U.S.C. 154(b) by 189 days.

(21) Appl. No.: 11/332,157

(22) Filed: Jan. 17, 2006

(65) Prior Publication Data

US 2006/0161032 A1 Jul. 20, 2006

Related U.S. Application Data

(60) Provisional application No. 60/643,581, filed on Jan. 14, 2005.

(51) Int. Cl.
*C10G 1/00* (2006.01)
(52) U.S. Cl. ............. 585/240; 585/266; 585/638; 585/700; 585/733; 585/739; 208/142; 204/157.15
(58) Field of Classification Search ........... 585/240, 585/638, 700, 733, 739, 266; 240/157.15; 208/142
See application file for complete search history.

(56) References Cited

U.S. PATENT DOCUMENTS 4,262,157 A   4/1981 Hori et al.
4,554,397 A   11/1985 Stern et al.
4,992,605 A   2/1991 Craig et al.
5,233,109 A   8/1993 Chow
5,705,722 A   1/1998 Monnier et al.
2002/0062055 A1 * 5/2002 Raulo et al. ............ 585/739

FOREIGN PATENT DOCUMENTS

GB   1524781   *   9/1978

OTHER PUBLICATIONS

Parmon et al., Catalysis Today, vol. 35, pp. 153-162 (1997).
Maier, W.F. et al., Chemische Berichte, vol. 115, No. 2, pp. 808-812 (1982).
Schmidt, K., Gerpen J.V., Society of Automotive Engineers "the Effect of Biodiesel Fuel Composition on Diesel Combustion and Emissions" Paper 961086, pp. 113-123 (1996).
Laurent, E. al., Applied Catalysis A vol. 109 pp. 77-96 and 97-115 (1994).

* cited by examiner

*Primary Examiner*—Glenn Caldarola
*Assistant Examiner*—Prem C. Singh
(74) *Attorney, Agent, or Firm*—Birch, Stewart, Kolasch & Birch, LLP

(57) ABSTRACT

Feedstock originating from renewable sources is converted to hydrocarbons in diesel fuel distillation range by contacting with a supported catalyst comprising VIII group metal/metals, whereby the consumption of hydrogen is decreased.

28 Claims, No Drawings

METHOD FOR THE MANUFACTURE OF HYDROCARBONS

FIELD OF THE INVENTION

The invention relates to a method for the manufacture of hydrocarbons from renewable sources and particularly to a selective method for the manufacture of hydrocarbons suitable for the diesel fuel pool. The invention also relates to a method for the manufacture of hydrocarbons with decreased consumption of hydrogen.

BACKGROUND OF THE INVENTION

Environmental interests and an increasing demand for diesel fuel encourage fuel producers to employ more intensively available renewable sources. However, known processes, utilizing such sources tend to result in an increase in carbon dioxide emissions with generally known negative effects. In the manufacture of diesel fuel the main interest is focused on vegetable oils and animal fats comprising triglycerides of fatty acids. Long, straight and mostly saturated hydrocarbon chains of fatty acids correspond chemically to the hydrocarbons present in diesel fuels. However, the neat vegetable oils display inferior properties, particularly extreme viscosity, and thus their use in fuels is limited.

Conventional approaches for converting vegetable oils into fuels comprise transesterification, hydrogenation and cracking, among others. Triglycerides, which form the main component in vegetable oils, are converted into the corresponding esters by the transesterification reaction with an alcohol in the presence of catalysts. However, poor low-temperature properties of the products obtained limit their wider use in regions with colder climatic conditions. Schmidt, K., Gerpen J. V.: SAE paper 961086 teaches that the presence of oxygen in esters results in undesirable higher emissions of $NO_x$, in comparison to conventional diesel fuels.

Thermal and catalytic cracking of bio-materials like vegetable oils and animal fats lead to a wide spectrum of products. U.S. Pat. No. 5,233,109 describes an example of such process using catalysts containing alumina and another component, such as silica or alumino-silicate. The reactions are generally unselective and less valuable products are formed as well. The unsaturated and aromatic hydrocarbons present in the liquid fraction make these products unattractive for the diesel pool.

U.S. Pat. No. 4,992,605 and U.S. Pat. No. 5,705,722 describe processes for the production of diesel fuel additives by conversion of bio-oils into saturated hydrocarbons under hydroprocessing conditions. The conversion of the carboxylic group into a methyl group requires relatively high hydrogen partial pressure of above 4.5 MPa. Hydrogen consumption is further increased due to eventual side reactions such as methanation and reverse water-gas shift reaction. The high hydrogen consumption limits the use of such processes, especially in refineries where the hydrogen balance is already almost negative because of complying with legislative requirements.

Undesired oxygen may be removed from fatty acids or esters by deoxygenation. The deoxygenation of bio-oils and fats to hydrocarbons, suitable as diesel fuel products, may be performed in the presence of catalysts under hydroprocessing conditions. During hydrodeoxygenation conditions oxo-groups are hydrogenated and therefore this reaction requires rather high amounts of hydrogen. Additionally, hydrogen is consumed in side reactions as well.

Decarboxylation of fatty acids results in hydrocarbons with one carbon atom less than the original molecule. The feasibility of decarboxylation varies greatly with the type of carboxylic acid used as the starting material. Activated carboxylic acids containing electron-attracting substituents in the position alpha or beta with respect to the carboxylic group lose carbon dioxide spontaneously at slightly elevated temperatures. In this case, the RC—COOH bond is weakened by the electron shift along the carbon chain.

The majority of fatty acids are, however, not activated. The positive induction effect of the carbon chain evokes a high electron density in the position alpha with respect to the carboxylic group making thus the release of $CO_2$ difficult. Although the decarboxylation of activated and non-activated carboxylic acids is thermodynamically comparable, the activation energy is significantly higher in the case of the latter one. Therefore drastic conditions or the presence of a catalyst are required to overcome the energetic barrier.

The fusion of alkaline salts of fatty acids with the corresponding hydroxides to hydrocarbons is known already from the 19th century. The reaction is highly unselective and ketones and cracking products, as well as undesired highly alkaline waste are formed with low conversion.

Further, there exist a number of decarboxylation reactions used mainly in organic synthesis. Most of them proceed via free radical mechanism.

U.S. Pat. No. 4,262,157 discloses a decarboxylation process utilizing diazacycloalkenes and Cu salts, wherein lauric acid reacts to form n-undecane with 51% yield at 320° C. Also decarboxylation of unsaturated acids to form hydrocarbons with one carbon less is described.

Indirect decarboxylation routes are also known, involving transformation of carboxylic acids into the corresponding halides, followed by their dehalogenation. Hunsdiecker's and Kochi's reactions are examples of such reactions and both reactions proceed via free radical mechanism.

Available alternative routes involve electrochemical and photo-catalytic decompositions. An example of electrochemical decomposition is the Kolbe electrolysis, wherein the reaction is started by anodic mono-electron oxidation leading to the formation of carboxylate radicals. Their subsequent decarboxylation results in probable formation of hydrocarbon radicals. Their dimerization or less often disproportionation leads to the termination of the free radical reaction. The electrolytic systems for the hydrocarbon synthesis usually comprise aqueous solvents, organic co-solvents, added salts and platinum electrodes. Under such conditions the reaction yields 50-90% of coupling hydrocarbon products. The main side products comprise 1-unsaturated hydrocarbons formed via disproportionation. A similar radical mechanism applies also for photo-catalytically initiated reactions.

Two step deoxygenation of oxygen-containing bio-oil compounds is described by Parmon et al: *Catalysis Today* 35 (1997) 153-162. The model compound, phenol, is in the first step treated with carbon monoxide over bimetallic alloy RhCu. The product, benzoic acid, consequently decarboxylates in the presence of PtPd or RuPd alloys in the second step The complexity of the decarboxylation reactions listed above and/or the low yield and very often, also the hazardous materials applied in the reactions, are the main drawbacks of these approaches.

Decarboxylation of carboxylic acids to hydrocarbons by contacting carboxylic acids with heterogeneous catalysts was suggested by Maier, W. F. et al: *Chemische Berichte* (1982), 115(2), 808-12. They tested $Ni/Al_2O_3$ and $Pd/SiO_2$ catalysts for decarboxylation of several carboxylic acids. During the reaction the vapors of the reactant passed through a catalytic bed together with hydrogen. Hexane represented the main product of the decarboxylation of the tested compound heptanoic acid. When nitrogen was used instead of hydrogen no decarboxylation was observed.

U.S. Pat. No. 4,554,397 discloses a process for the manufacture of linear olefins from saturated fatty acids or esters. The catalytic system consists of nickel and at least one metal selected from the group consisting of lead, tin and germanium. According to the examples, when other catalysts, such as Pd/C were used, low catalytic activity, cracking to saturated hydrocarbons or formation of ketones when Raney-Ni was used, were observed.

Decarboxylation, accompanied with hydrogenation of oxo-compound, is described in Laurent, E., Delmon, B.: *Applied Catalysis*, A: General (1994), 109(1), 77-96 and 97-115, wherein hydrodeoxygenation of biomass derived pyrolysis oils over sulphided CoMo/$\gamma$-Al$_2$O$_3$ and NiMo/$\gamma$-Al$_2$O$_3$ catalysts was studied. Di-ethyldecanedioate (DES) was used among others as a model compound and it was observed that the rates of formation of the decarboxylation product (nonane) and the hydrogenation product (decane) were comparable under hydrotreating conditions (260-300° C., 7 MPa, in hydrogen). NiMo/$\gamma$-Al$_2$O$_3$ showed slightly higher selectivity towards decarboxylation products in comparison to CoMo/$\gamma$-Al$_2$O$_3$ catalyst. The presence of hydrogen sulphide, in contrary to ammonia, also promoted the decarboxylation, particularly when NiMo catalysts were used.

A process for converting an ester-containing vegetable oil into hydrocarbons is disclosed in GB 1,524,781. The conversion to hydrocarbons is performed over a catalyst containing an admixture of silica-alumina with an oxide of a transition state metal of groups IIA, IIIA, IVA, VA, VIA, VIIA, or VIIIA of the periodic table at the reaction temperatures of 300-700° C. The products formed are reported to be free from oxygenated compounds (other than carbon dioxide and water). In accordance with the examples, extensive cracking is, however, observed.

Based on the above it can be seen that there exists an evident need for an industrially applicable catalytic method for the selective manufacture of hydrocarbons from renewable sources, utilising the decarboxylation reaction.

OBJECT OF THE INVENTION

An object of the invention is a method for the selective manufacture of hydrocarbons suitable for the diesel fuel pool.

A further object of the invention is to provide a method for the selective manufacture of hydrocarbons with decreased consumption of hydrogen.

A still further object of the invention is to provide an industrially applicable catalytic method for the selective manufacture of hydrocarbons suitable for the diesel fuel pool from renewable sources, utilizing the decarboxylation/decarbonylation reaction.

Characteristic features of the method according to the invention are provided in the claims.

Here decarboxylation/decarbonylation is understood to mean the removal of carboxyl oxygen, such as triglyceride oxygen, through $CO_2$ (decarboxylation) or through CO (decarbonylation).

Hydrodeoxygenation (HDO) of triglycerides means removal of water using hydrogen.

Here deoxygenation is understood to mean removal of carboxyl oxygen, such as triglyceride oxygen by any means previously described.

Here diesel fuel pool is understood to mean hydrocarbons boiling in the range of 180-350° C.

SUMMARY OF THE INVENTION

The present invention relates to a catalytic method for the selective manufacture of hydrocarbons, which are suitable for diesel fuel pool, from renewable sources, such as plant and vegetable oils and fats and animal and fish oils and fats. The invention concerns the transformation of the starting materials comprising fatty acids, derivatives of fatty acids, such as esters of fatty acids as well as triglycerides of fatty acids, or metal salts of fatty acids, or combinations of thereof, into hydrocarbons with minimal consumption of hydrogen, by contacting the starting material with a heterogeneous catalyst comprising at least one metal selected from the metals belonging to the group VIII of the Periodic Table. The hydrocarbon product formed via the decarboxylation/decarbonylation reaction has one carbon atom less than the original fatty acid or fatty acid portion of its derivate. Optionally the hydrocarbon product is isomerized.

DETAILED DESCRIPTION OF THE INVENTION

It has now been surprisingly found that the deoxygenation of starting materials originating from renewable sources can be achieved by using an alternative reaction route—decarboxylation/decarbonylation, where oxygen is removed in the form of CO and $CO_2$ from the original compounds in the starting material/feedstock. In this way hydrocarbons can be selectively manufactured from plant and vegetable oils and fats as well as animal and fish oils and fats without high consumption of hydrogen.

The present invention is particularly directed to a method for the selective manufacture of hydrocarbons in the diesel fuel distillation range from renewable sources. The reaction conditions and the catalyst employed in the decarboxylation/decarbonylation process of bio-oils are essential for the invention. Under suitable conditions, hydrogen is required only for the reduction of the catalyst. Consequently, the consumption of hydrogen can be decreased significantly. The method may also comprise an optional catalyst pre-treatment step. Additionally the method may comprise an optional isomerization step.

The method according to the invention comprises the steps wherein a feedstock originating from renewable sources and optionally a solvent or a mixture of solvents are brought into contact with an optionally pre-treated heterogeneous catalyst selected from supported catalysts containing one or more Group VIII metals, and a decarboxylation/decarbonylation reaction is carried out at a temperature of 200-400° C., preferably 250-350° C. under a pressure from atmospheric pressure (0.1 Mpa) to 15 MPa, preferably of 0.1-5 MPa to yield as a product a mixture of linear hydrocarbons, preferably linear paraffins boiling in the range of 180-350° C., the diesel fuel range, and having one carbon atom less than the original fatty acid chain.

The heterogeneous catalyst is optionally pre-treated with hydrogen at a temperature of 100-500° C., preferably 150-250° C. The pre-treatment of the heterogeneous catalyst is preferable as it ensures the activity of the catalyst.

The decarboxylation/decarbonylation reaction is carried out in liquid phase, thus the reaction pressure is higher than the saturation vapor pressure of the feedstock at a given reaction temperature. The reaction pressure ranges from atmospheric pressure to 15 MPa, taking into consideration the properties of the feedstock.

Optionally a gas flow comprising an inert gas such as nitrogen, helium or argon, hydrogen or combinations thereof may be used for removing gaseous products formed during the reaction.

The obtained product, hydrocarbon mixture, is optionally isomerized in order to convert further the obtained hydrocarbons to isomerized hydrocarbons with improved cold properties, such as cloud point and pour point.

In the isomerization step, the pressure varies in the range of 2-15 MPa, preferably in the range of 3-10 MPa and the temperature varies between 200 and 500° C., preferably between 280 and 400° C. In the isomerization step, isomerization catalysts known in the art may be used. Suitable isomerization catalysts contain a molecular sieve and/or a metal selected from Group VIII of the Periodic Table and/or a carrier. Preferably, the isomerization catalyst contains SAPO-11 or SAPO-41 or ZSM-22 or ZSM-23 or ferrierite and Pt, Pd or Ni and $Al_2O_3$ or $SiO_2$. Typical isomerization catalysts are, for example, Pt/SAPO-11/$Al_2O_3$, Pt/ZSM-22/$Al_2O_3$, Pt/ZSM-23/$Al_2O_3$ and Pt/SAPO-11/$SiO_2$. An isomerized product, which is a mixture of branched hydrocarbons and preferably branched paraffins boiling in the range of 180-350° C., the diesel fuel range, and having one carbon atom less than the original fatty acid chain, is obtained. Additionally some gasoline and gas may be obtained.

Starting Material

The starting material or feedstock originates from renewable sources, such as fats and oils from plants and/or animals and/or fish and compounds derived from them, also known as bio-oils. Examples of suitable bio-oils are plant and vegetable oils and fats, animal fats and oils, fish fats and oils, and mixtures thereof containing fatty acids and/or fatty acid esters. Particularly suitable materials are wood-based and other plant-based and vegetable-based fats and oils such as rapeseed oil, colza oil, canola oil, tall oil, sunflower oil, soybean oil, hempseed oil, olive oil, linseed oil, mustard oil, palm oil, peanut oil, castor oil, coconut oil, as well as fats contained in plants bred by means of gene manipulation, animal-based fats such as lard, tallow, train oil, and fats contained in milk, as well as recycled fats of the food industry and mixtures of the above.

Preferably the feedstock comprises C8-C24 fatty acids, derivatives of said fatty acids, such as esters of said fatty acids as well as triglycerides of said fatty acids, metal salts of said fatty acids, or combinations of thereof. The fatty acids or fatty acid derivatives, such as esters may be produced via hydrolysis of bio-oils or by their fractionalization, or by esterification reactions of triglycerides. Suitably triglyceride fractions of rapeseed oil, linseed oil, sunflower oil, tallow and lard and fractions of tall oil are used as the feedstock.

The hydrocarbon products obtained utilizing the method according to the invention have one carbon atom less than the original fatty acid or the fatty acid fraction of its derivate in the starting material.

Reaction Conditions

The decarboxylation/decarbonylation reaction conditions may vary with the feedstock used. The reaction is carried out in liquid phase. The reaction is carried out at a temperature of 200-400° C., preferably 250-380° C. The reaction may be conducted under atmospheric pressure. However, in order to maintain the reactants in the liquid phase it is preferable to use higher pressure than the saturation vapour pressure of the feedstock at a given reaction temperature and thus the reaction pressure ranges from atmospheric pressure (0.1 MPa) to 15 MPa and preferably from 0.1 to 5 MPa, depending on the properties of starting material.

Solvent

The optional solvent is selected from the group consisting of hydrocarbons, such as paraffins, isoparaffins, naphthenes and aromatic hydrocarbons in the boiling range of 150-350° C., and recycled process streams containing hydrocarbons, and mixtures thereof, preferably the recycled product streams obtained from the method are used.

Gas Flow

Optionally a gas flow, which may also be called as carrier gas, comprising an inert gas such as nitrogen, helium or argon, or hydrogen or combinations thereof may be used for removing gaseous products formed during the reaction. The gas flow may be combined with the feedstock or it may be led to the reaction mixture or it may be led to different parts in the reactor. The feedstock may contain 0.1-40 vol. %, preferably 2-15 vol. % of hydrogen in order to maintain appropriate long-term catalyst activity and to prevent the formation of unsaturated products, especially in the case when esters and triglycerides are used as the starting material. Hydrogen is preferably added to the feedstock or to the reaction mixture.

Catalyst

The catalyst in the decarboxylation/decarbonylation reaction is a supported heterogeneous catalyst comprising at least one active elemental metal selected from the metals belonging to the Group VIII of the Periodic Table. Suitable metals are Pt, Pd, Ni, Ir, Ru and Rh and preferable ones are Pd and Pt, supported on oxides, mesoporous materials or carbonaceous supports, such as $Al_2O_3$, $SiO_2$, $Cr_2O_3$, MgO, $TiO_2$ or C. Preferably the support is activated carbon or other carbonaceous support or structured catalyst support. Structured catalyst supports, such as carbon fibres, carbon nanotubes attached to monoliths and carbon cloths are suitable support materials as well. Loading of the active metal varies in the range of 0.5-20 wt %, preferably 2-8 wt %. In the case nickel is used, the loading varies in the range of 2-55 wt %, preferably 10-30 wt %.

The reaction may be carried out in batch, semi-batch or continuous mode of reaction, in reactors such as trickle-bed, continuous tubular or continuous stirred tank reactors in order to separate the gaseous $CO_2$ and the light hydrocarbons extricated from esters and triglycerides of fatty acids. Thus the desired diesel fraction products, suitable for combustion in conventional engines, may be produced.

The obtained product is a mixture of linear hydrocarbons, preferably linear paraffins boiling in the range of 180-350° C., the diesel fuel range, and having one carbon atom less than the original fatty acid chain.

After the optional isomerization step a mixture of branched hydrocarbons is obtained, preferably branched paraffins boiling in the range of 180-350° C., having improved cold properties, such as low cloud point and pour point.

The method according to the invention has several advantages. It provides a novel way for the selective manufacture of hydrocarbons, suitable for the use as diesel fuel or for the manufacture of diesel fuel, via decarboxylation/decarbonylation of a feedstock, particularly oxygenated feedstock, originating from renewable sources. The consumption of hydrogen in the method is low, the reaction temperature is sufficiently low when compared to thermal non-catalytic processes and thus no undesired decomposition of the feedstock was observed. Hydrogen, which is currently almost exclusively produced from fossil fuels, is only needed for the optional pre-treatment of the catalyst; however, it may be present also in the reactant stream in low concentrations. It is not consumed in side reactions or in direct reduction of carboxylic groups. Undesired side reactions, such as cracking, are negligible, as can be seen in the examples.

Further, in the method according to the invention, the oxygenated feedstock, such as C8-C24 fatty acids, as well as derivatives of said fatty acids, such as esters of said fatty acids, triglycerides of said fatty acids, or metal salts of said fatty acid are converted to the desired hydrocarbons with high selectivity. The hydrocarbon product has one carbon atom less than original fatty acid or fatty acid portion of its derivative. The structure of the obtained hydrocarbon product corresponds to the main chain of the starting material.

No hazardous solvents are used in the method and neither hazardous waste is formed. Carbon dioxide released during the process originates from renewable sources and thus its production does not contribute on greenhouse effect.

Conducting of the reaction in a liquid phase is preferential and brings several advantages over a gas phase reaction. A gas phase reaction requires high reaction temperature in order to vaporize feedstock, which causes decomposition of high-boiling compounds and supports endothermic side reactions as well as deactivation due to sintering and fouling. Maintaining of the reactants in liquid phase yields also more feasible process control.

A hydrocarbon product suitable for the diesel fuel pool, with superoir properties can be obtained.

The invention is illustrated in the following with examples presenting some preferable embodiments of the invention. However, it is evident to a man skilled in the art that the scope of the invention is not meant to be limited to these examples.

EXAMPLES

Example 1

Decarboxylation of Stearic Acid

Series of experiments were carried out in a Parr autoclave equipped with a heating mantle, stirrer, baffles and bubble-unit. 1 g of a catalyst, presented in table 1 below, was placed into the autoclave and pre-treated under hydrogen flow at a temperature of 200° C. After the pre-treatment, 85 g of dodecane (solvent) and 4.5 g of stearic acid were fed into the reactor. The reaction temperature was kept at 300° C., while passing helium gas through the reactor. The reactor pressure of 0.8 MPa maintained the reactants and products in liquid phase with the exception of $CO_2$, which was removed with helium gas acting as carrier gas, from the reactor. The conversions of stearic acid and the selectivities towards C17-products and the desired product, heptadecane (in brackets), after 90 minutes of the reaction with respect to catalyst used in the reaction are also listed in table 1. From the table 1 in can be seen that particularly preferable catalysts were Pd/C and Pt/C.

TABLE 1

| Catalyst | Metal loading, wt % | Conversion, % | C17-Selectivity, mol. % | Cracking-Selectivity, mol. % |
|---|---|---|---|---|
| Rh/C | 1 | 9 | 86 (21) | <0.5 |
| Ni/Al$_2$O$_3$ | 17 | 8 | 35 (14) | 4.3 |
| Ni/Cr$_2$O$_3$ | 60 | 5 | 38 (22) | 6.3 |
| Ni/SiO$_2$ | 6 | 10 | 57 (16) | 5.6 |
| Pd/Al$_2$O$_3$ | 5 | 12 | 83 (38) | <0.5 |
| Pd/C | 10 | 25 | 99 (78) | <0.5 |
| Pd/C | 5 | 100 | 99 (97) | <0.5 |
| Pd/C | 1 | 20 | 96 (64) | <0.5 |
| Pt/Al$_2$O$_3$ | 5 | 7 | 70 (26) | <0.5 |

TABLE 1-continued

| Catalyst | Metal loading, wt % | Conversion, % | C17-Selectivity, mol. % | Cracking-Selectivity, mol. % |
|---|---|---|---|---|
| Pt/C | 5 | 43 | 98 (95) | <0.5 |
| Ru/C | 5 | 4 | 61 (17) | 4.4 |

Example 2

Decarboxylation of Stearic Acid in the Presence of a Bimetallic Catalyst

In a procedure similar to the one presented in Example 1, a bimetallic catalyst, Pd(8 wt %)Pt(2 wt %)/C, was used. After 90 minutes of reaction 40 mol. % of stearic acid was converted with the selectivity of 83 mol. % towards n-heptadecane formation.

Example 3

Decarboxylation of Stearic Acid in the Presence of Different Gases

In the reaction apparatus described in Example 1, a set of three experiments was performed. In all cases, 1 g of the catalyst (Pd(5 wt %)/C) was charged into the reactor, followed by its reduction under hydrogen flow at 200° C. 45 g of stearic acid and 40 g of dodecane were subsequently fed into the reactor. During the reactions carried out at 300° C., reactor pressure of 1.9 MPa was maintained by helium gas, a gas mixture of hydrogen (5 vol. %) and argon (95 vol. %), and hydrogen gas, respectively, in the individual experiments. The conversions of stearic acid and selectivities towards n-heptadecane are listed in the following table 2. From table 2 it can be seen that a mixture of hydrogen (5 vol. %) with an inert gas yields a high selectivity of n-heptadecane (93 mol %).

TABLE 2

| Gas | Reaction time, min | Conversion, % | C17-Selectivity, mol. % |
|---|---|---|---|
| Helium | 300 | 41 | 96 (83) |
| Hydrogen | 360 | 49 | 95 (94) |
| Hydrogen (5 vol. %) + argon (95 vol. %) | 360 | 62 | 95 (93) |

Example 4

Decarboxylation of Ethyl Stearate

In the reaction apparatus described in Example 1, another set of three experiments was run. In all cases, 1 g of the catalyst (Pd (5 wt %)/C) was charged into the reactor followed by its reduction under hydrogen flow at 200° C. 50 g of ethyl stearate and 40 g of dodecane were subsequently fed into the reactor. During the reactions performed at 300° C., 330° C., and 360° C. reactor pressures of 1.9 MPa, 2.3 MPa, and 2.9 MPa, respectively, were maintained by gas mixture comprising hydrogen (5 vol. %), and argon (95 vol. %). Please amend the pressure units in the table Conversions of ethyl stearate and selectivities towards C17-products and n-heptadecane (in brackets) are listed in the following table 3.

TABLE 3

| Reaction temperature, ° C. | Reactor pressure, bar | Conversion, % | C17-Selectivity, mol. % |
|---|---|---|---|
| 300 | 18 | 33 | 98 (74) |
| 330 | 22 | 66 | 96 (71) |
| 360 | 28 | 100 | 95 (76) |

Example 5

Decarboxylation of Behemic Acid and Nonanoic Acid

In a procedure similar to the one in Example 3.54 g of behemic acid (purity 89%) and 45 g of dodecane were placed into the reactor. The conversion of 45% and selectivity of 90 mol. % towards n-heneicosane formation were achieved after six hours of reaction at 300° C. and under a reactor pressure of 1.9 MPa of hydrogen (5 vol. %)-argon (95 vol. %) gas mixture. Similarly, nonanoic acid was used as the reactant. The reaction proceeded with comparable yield of the decarboxylation product, octadecane.

Example 6

Decarboxylation of Grycerol Tristearate

In a procedure similar to the one in Example 3.47 g of glycerol tristearate and 45 g of dodecane were charged into the reactor. During the reaction conducted at 360° C., reactor pressure of 4.2 MPa was maintained by a flow of a gas mixture comprising hydrogen (5 vol. %)-argon (95 vol. %). Only traces of glycerol tristearate (0.08 wt %) were identified in the liquid phase after six hours reaction time. According to GPC analysis the selectivity towards formation of C17-hydrocarbons was at least 85 WT % based on conversion of glycerides. n-Heptadecane was the main product in the mixture of C17-hydrocarbon isomers.

The selectivity towards cracking products was minor.

Example 7

Isomerization of n-Paraffins Formed During Decarboxylation/Decarbonylation

Paraffinic feed, containing 94 wt-% of C15-C18 n-paraffins, was isomerized with an isomerization catalyst at 340° C. and 60 bar in a fixed bed reactor. Hydrogen was fed to the reactor 600 l/(l oil feed). The isomerization catalyst was a platinum-based commercial catalyst. The product of isomerization contained 67 wt-% of C15-C18 isoparaffins. The cloud point of the product was −12° C., compared to 26° C. for the n-paraffin feed.

Example 8

Decarboxylation of Lauric Acid in Continuous Mode

The continuous decarboxylation of lauric acid was carried out in a fixed bed tubular reactor at 270° C. 0.4 g of Pd(5%)/C catalyst was placed in the reactor and pretreated in a procedure described in example 1. The reaction pressure of 0.8 MPa maintained reactant, products and solvent (dodecane) in liquid phase with the exception of $CO_2$. The reaction mixture containing 5 mol % of lauric acid in solvent was continuously fed through the catalyst bed with the volumetric flow of 0.1 ml/min. Lauric acid was completely converted with initial selectivity of 98 mol % towards C11 products (undecane selectivity of 92 mol %).

The invention claimed is:

1. A method for the selective manufacture of hydrocarbons suitable for diesel fuel pool, which comprises carrying out a decarboxylation/decarbonylation reaction by bringing a feedstock comprising C8-C24 fatty acids, derivatives of C8-C24 fatty acids, or combinations thereof, and optionally a solvent or a mixture of solvents, into contact with a heterogeneous elemental metal catalyst containing one or more Group VIII metals selected from platinum, palladium, nickel, iridium, ruthenium and rhodium on a support selected from oxides, mesoporous materials, carbonaceous supports and structured catalyst supports, at a temperature of 200-400° C. and under a pressure from 0.1 MPa to 15 MPa, to yield as a product hydrocarbons.

2. The method according to claim 1, wherein the temperature is 250-350° C. and the pressure is 0.1-5 Mpa.

3. The method according to claim 1, wherein in that the heterogeneous catalyst is pre-treated with hydrogen at a temperature of 100-500° C. before contacting it with the feedstock.

4. The method according to claim 1, wherein in that the heterogeneous catalyst is pre-treated with hydrogen at a temperature of 150-250° C. before contacting it with the feedstock.

5. The method according to claim 1, wherein in that the product is isomerized under a pressure in the range of 2-15 MPa at a temperature between 200 and 500° C. in the presence of an isomerization catalyst.

6. The method according to claim 5, wherein the product is isomerized under a pressure in the range of 3-10 MPa and at a temperature between 280 and 400° C.

7. The method according to claim 1, wherein the decarboxylation/decarbonylation reaction is carried out in liquid phase.

8. The method according to claim 1, wherein the renewable sources are fat and oils from plants and/or animals and/or fish and compounds derived there from.

9. The method according to claim 1, wherein the feedstock is selected from wood-based, plant-based and vegetable-based fats and oils, fats contained in plants bred by means of gene manipulation, animal-based fats and oils, fish based fats and oils and recycled fats of the food industry and mixtures thereof.

10. The method according to claim 1, wherein the feedstock is selected from rapeseed oil, colza oil, canola oil, tall oil, sunflower oil, soybean oil, hempseed oil, olive oil, linseed oil, mustard oil, palm oil, peanut oil, castor oil, coconut oil, lard, tallow, train oil, and fats contained in milk.

11. The method according to claim 1, wherein the feedstock comprises triglyceride fractions of rapeseed oil, linseed oil, sunflower oil, tallow and lard, or fractions of tall oil.

12. The method according to claim 1, wherein the derivatives of fatty acids comprise esters of fatty acids, triglycerides of fatty acids and metal salts of fatty acids.

13. The method according to claim 1, wherein the Group VIII metal is platinum or palladium.

14. The method according to claim 1, wherein the support is selected from $Al_2O_3$, $SiO_2$, $Cr_2O_3$, MgO, $TiO_2$, activated carbon, carbon fibres, carbon nanotubes attached to monoliths and carbon cloths.

15. The method according to claim 1, wherein the support is selected from activated carbon, carbon fibres, carbon nanotubes attached to monoliths and carbon clot.

16. The method according to claim 1, wherein the solvent is selected from the group consisting of hydrocarbons in the boiling range of 150-350° C. and recycled process streams containing hydrocarbons and combinations thereof.

17. The method according to claim 1, wherein 0.1-40 vol. % of hydrogen is added to the feedstock.

18. The method according to claim 1, wherein 2-15 vol. % of hydrogen is added to the feedstock.

19. The method according to claim 16, wherein the hydrocarbons are selected from the group consisting of paraffins, isoparaffins, naphthenes and aromatic hydrocarbons.

20. The method according to claim 12, wherein the support is selected from $Al_2O_3$, $SiO_2$, $Cr_2O_3$, MgO, $TiO_2$, activated carbon, carbon fibers, carbon nanotubes attached to monoliths and carbon cloths.

21. The method according to claim 20, wherein the Group VIII metal is platinum or palladium.

22. The method according to claim 21, wherein the solvent is selected from the group consisting of paraffins, isoparaffins, naphthenes and aromatic hydrocarbons, in the boiling range of 150-350° C., and recycled process streams containing hydrocarbons and combinations thereof.

23. The method according to claim 1, wherein the elemental metal catalyst contains platinum.

24. The method according to claim 1, wherein the elemental metal catalyst contains palladium.

25. The method according to claim 1, wherein the elemental metal catalyst contains nickel.

26. The method according to claim 1, wherein the elemental metal catalyst contains iridium.

27. The method according to claim 1, wherein the elemental metal catalyst contains ruthenium.

28. The method according to claim1, wherein the elemental metal catalyst contains rhodium.

* * * * *

UNITED STATES PATENT AND TRADEMARK OFFICE
CERTIFICATE OF CORRECTION

PATENT NO. : 7,491,858 B2  Page 1 of 1
APPLICATION NO. : 11/332157
DATED : February 17, 2009
INVENTOR(S) : Dmitry Yu Murzin et al.

It is certified that error appears in the above-identified patent and that said Letters Patent is hereby corrected as shown below:

On the title page of the Letters Patent at Item 73:

"Fortum Oyj, Espoo (FI)" should read --Nestle Oil Oyj, Espoo (FI)--

Signed and Sealed this

Third Day of August, 2010

David J. Kappos
*Director of the United States Patent and Trademark Office*